US005422152A

United States Patent [19]

Langeland et al.

[11] Patent Number: 5,422,152

[45] Date of Patent: Jun. 6, 1995

[54] SLEEVE LABEL ATTACHMENT

[75] Inventors: Robert J. Langeland, Grand Rapids; Eloy M. Cantu, Jr., Ada, both of Mich.

[73] Assignee: Oliver Products Company, Grand Rapids, Mich.

[21] Appl. No.: 191,853

[22] Filed: Feb. 3, 1994

[51] Int. Cl.[6] .......... B32B 1/08; B32B 7/12

[52] U.S. Cl. .......... 428/36.9; 428/36.91; 428/40; 428/194; 24/68 C; 24/304; 40/306; 40/307

[58] Field of Search .......... 428/194, 36.9, 36.91, 428/40; 24/68, 304; 40/306, 307, DIG. 11

[56] References Cited

U.S. PATENT DOCUMENTS

| | | | |
|---|---|---|---|
| 629,315 | 7/1899 | Dorticus . | |
| 645,780 | 3/1900 | Bennett . | |
| 706,635 | 8/1902 | Booth | 40/306 |
| 897,115 | 8/1908 | Lindberg . | |
| 912,820 | 2/1909 | Davis | 40/665 |
| 948,772 | 2/1910 | Shepard . | |
| 1,036,588 | 8/1912 | Eastburn . | |
| 1,220,435 | 3/1917 | Lauer . | |
| 1,227,122 | 5/1917 | Eberhart | 40/306 |
| 1,227,123 | 5/1917 | Eberhart | 40/306 |
| 1,243,291 | 10/1917 | Hazelton . | |
| 1,514,790 | 11/1924 | Range . | |
| 2,001,679 | 5/1935 | Haughey | 40/21 |
| 2,188,710 | 1/1940 | Giovanini | 40/665 |
| 2,449,798 | 9/1948 | Weber | 24/19 |
| 2,613,462 | 10/1952 | Johnson | 40/307 |
| 2,654,926 | 10/1953 | Delafosse | 24/16 |
| 2,685,979 | 8/1954 | Zeek et al. | 220/648 |
| 2,841,855 | 7/1958 | Weber | 24/273 |
| 2,949,953 | 8/1960 | De Maio | 154/28 |
| 3,192,614 | 7/1965 | Gardner | 29/200 |
| 3,203,058 | 8/1965 | Roing | 24/68 |
| 3,564,671 | 2/1971 | Straus | 24/270 |
| 3,787,993 | 1/1974 | Lyon | 40/306 |
| 3,797,077 | 3/1974 | Omori | 24/273 |
| 3,858,279 | 1/1975 | Brattstrom | 24/68 |
| 3,860,998 | 1/1975 | Schnurmacher | 24/68 |
| 3,994,051 | 11/1976 | Serretti | 24/273 |
| 4,005,506 | 2/1977 | Moore | 24/68 |
| 4,023,589 | 5/1977 | Rejeski | 138/149 |
| 4,264,388 | 4/1981 | McClintock | 156/152 |
| 4,351,693 | 9/1982 | Fuller | 156/556 |
| 4,379,359 | 4/1983 | Young | 24/273 |
| 4,612,718 | 9/1986 | Golub | 40/21 |
| 4,640,031 | 2/1987 | Hoek | 40/306 |
| 4,701,982 | 10/1987 | Matsuno | 24/273 |
| 4,725,465 | 2/1988 | Lastovich | 428/35 |
| 4,827,643 | 5/1989 | Hearst | 40/306 |
| 4,857,371 | 8/1989 | McClintock | 428/36.9 X |
| 4,918,790 | 4/1990 | Cirket et al. | 24/71 |
| 5,044,814 | 9/1991 | Hama | 24/273 |
| 5,138,784 | 8/1992 | Niwa | 40/665 |

*Primary Examiner*—Daniel R. Zirker
*Attorney, Agent, or Firm*—Price, Henevel, Cooper, DeWitt & Litton

[57] ABSTRACT

A sleeve label for application to the peripheral exterior of an article such as a gas cylinder, including a flexible label sleeve having a circumference and a central axis, and first and second portions parallel to its axis and extending the length of the label sleeve; an elongated, stiff strip having first and second edges extending the length of the strip, and having an inner face and an outer face; the first sleeve portion being attached to the strip to extend from and be flexible about the first edge of the strip, and the second sleeve portion being attached to the strip to extend from the inner face at a location intermediate the edges of the strip; the strip being on the exterior of the label sleeve, with the second edge of the strip and the outer face of the strip being exposed; the strip being pivotable about its first edge to flex the sleeve at and about the first edge of the strip to turn the outer face of the strip inwardly against the label sleeve and simultaneously pull a segment of the sleeve outwardly of the strip, and thereby decrease the circumference of the sleeve; and securing means such as adhesive for securing the outer face of the strip to the sleeve. The adhesive may be pressure sensitive adhesive and include a removable protective cover over the adhesive. The sleeve preferably has a nonslip polymeric material on its inner face, most preferably in a dot matrix of protrusions to interfit with surface roughness of a gas cylinder or the like.

15 Claims, 2 Drawing Sheets

SLEEVE LABEL ATTACHMENT

BACKGROUND OF THE INVENTION

This invention relates to sleeve labels for application to the peripheral exterior of an object, and more particularly to a contractible sleeve label as for objects such as bottled gas containers and the like.

Federal regulations, as well as commercial reality, require explicit wording indicia to be applied to cylindrical containers such as cylinders of bottled gas. Typically this can be applied by a variety of methods including stencil printing or use of preprinted pressure sensitive labels, with the latter being more common and preferred. In order to subsequently apply another set of indicia on the container, the first set of indicia must be removed. This is typically a rather tedious and costly process employing sand blasting, manual scraping or the like, to remove adhesive and label residue.

What has been needed is a label which is as readily applied as a pressure sensitive label, which will remain securely on the container during shipment and use, but which can be easily, quickly and inexpensively removed for replacement with another label.

SUMMARY OF THE INVENTION

An object of this invention is to provide such a label which can be easily applied, which will remain secure in application during shipment and use, and yet which can be quickly, easily and inexpensively removed without leaving adhesive or label residue, for replacement by another label.

The novel label comprises a flexible sleeve of an initial circumference greater than that of the container to which it is to be applied, an elongated stiff strip having first and second edges and attached to the flexible sleeve such that one sleeve portion extends from the first edge of the strip and a second sleeve portion extends from the inner face of the strip at a location spaced from this first edge of the strip, and usually intermediate its first and second edges, so that, prior to application of the sleeve on an object, the second edge and the outer face of the strip are exposed. The strip is pivotable about its first edge to turn the outer strip face inwardly against the label sleeve, turn the inner strip face outwardly, and pull a segment of the sleeve outwardly of the strip to thereby decrease the circumference of the label sleeve, causing the label to grip onto the object. The inner face of the sleeve has a nonslip, high friction, dot matrix coating thereon to cause it to grip onto the outer object surface but not be bonded thereto. The outer face of the strip has securing means such as adhesive for securing the strip outer face to the sleeve in the applied, contracted condition of the sleeve and thereby retain it. Prior to application of the sleeve to the cylinder, this adhesive is covered with a removable protective cover. Alternatively, the strip can be secured with the outer face against the sleeve as by tape, hook and loop fasteners, or the like.

Certain additional advantages and features of the invention will become apparent to those in the art upon studying the following specification in conjunction with the drawings.

DESCRIPTION OF THE PREFERRED EMBODIMENTS

Figure 1:
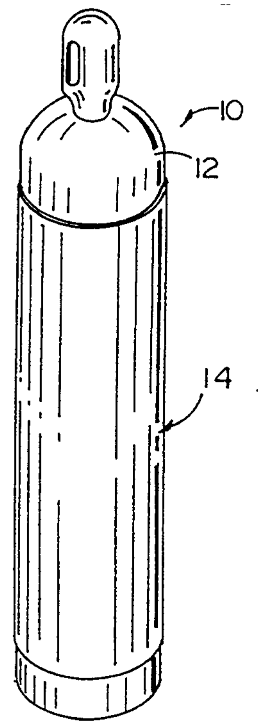
FIG. 1 is a perspective view of a product, namely a gas cylinder, having a sleeve label thereon in accordance with this invention.
Figure 2:
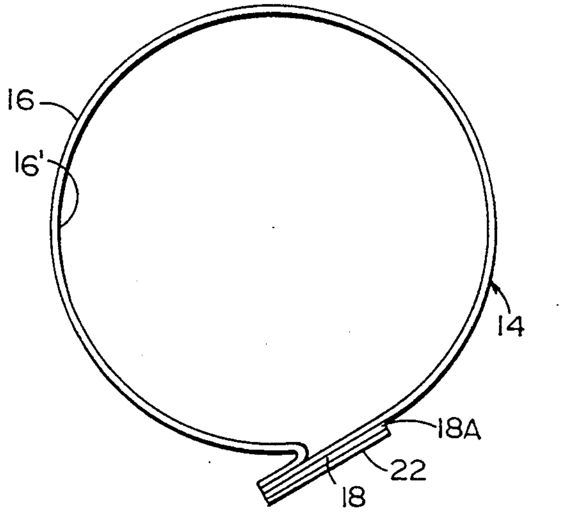
FIG. 2 is an end elevational view of the novel label prior to its application.

The terminology "sleeve label" as used herein is intended to mean the entire label including the component pans of a label sleeve and a stiff strip. The terminology "label sleeve" or "sleeve" is intended to mean the sleeve itself, i.e., not including the stiff strip.

Referring now specifically to the drawings, the article 10 there depicted as illustrative of the invention includes a conventional gas cylinder bottle 12 which is basically cylindrical in configuration, having the novel label assembly 14 thereon. The sleeve label invention was initially developed to suit objects such as gas cylinders, and therefore will be described largely for this application as illustrative of its uses. This novel label assembly includes a circumferential flexible sleeve 16 having a stiff strip 18 secured thereto and forming pan of the sleeve label. The peripheral label sleeve 16 can be made of a variety of materials including polymeric film, paper, a composite of nonwoven, spun bonded, materials such as high density polyethylene, e.g., a polyethylene material produced by DuPont Corporation and identified as TYVEK® polyester or polypropylene, e.g., a polypropylene material produced by Reemay Corporation and identified as TYPAR®. These latter materials are preferred because of characteristics of being puncture resistant, breathable in order to shed moisture from the surface of the container, abrasion resistant, printable and resistant to weathering. The sleeve material can have an additional conventional ultraviolet-resistant coating. It is preferably slightly stretchable to accommodate container expansion when the container is pressure filled. The sleeve can be formed in several different ways, as will be understood from the examples to be described hereinafter. The elongated stiff strip 18 extends the length of label sleeve 16 and can be formed of any of several generally stiff materials such as cardboard, plastic or metal, for example, depending upon such factors as cost, the type of article on which the label is to be placed, the type of environment encountered, etc.

Figure 3:
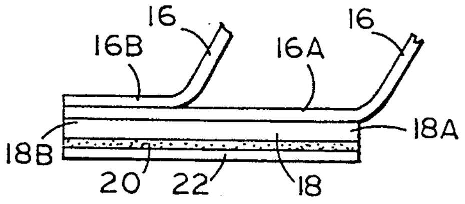
FIG. 3 is an enlarged, fragmentary end view of a portion of the label sleeve and attachment thereof to the strip.
Figure 3A:
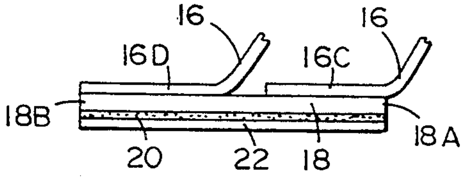
FIG. 3A is an enlarged, fragmentary end view of a portion of a modified label sleeve and attachment thereof to the strip.
Figure 3B:
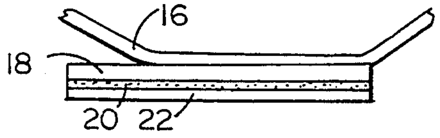
FIG. 3B is an enlarged, fragmentary, end view of a portion of a second modification label sleeve and attachment thereof to the strip.

Label sleeve 16 as attached to strip 18 can be of one unitary piece having its ends 16A and 16B bonded in overlapping relationship as shown in FIGS. 2–5, and bonded to the strip, or can have two ends 16C and 16D which are both attached to the strip in the manner shown in FIG. 3A. Another alternative is to have a continuous periphery with part of the outer face of strip 18 bonded to the outer sleeve as in FIG. 3B. The label sleeve is secured to the strip 18 as by adhesive and/or staples and/or being embedded between layers of the strip, or otherwise. In FIG. 3 is depicted the preferred version wherein the label sleeve 16 has two ends, one end 16A being bonded to strip 18 so as to extend from the first edge 18A of strip 18, and the other end 16B of the label sleeve being bonded to end 16A and thus indirectly to strip 18 so as to extend from the strip at a point spaced from edge A and usually intermediate the edges 18A and 18B. In other words, these first and second ends are portions which are parallel to the central axis of the sleeve.

On the outside face of strip 18, depicted in FIGS. 1–6, is shown a layer of adhesive 20 and a removable protective cover 22. By removing the protective cover, the outside face of the strip can be adhered to the outer face of the label sleeve in a manner to be described hereinafter.

Figure 4:
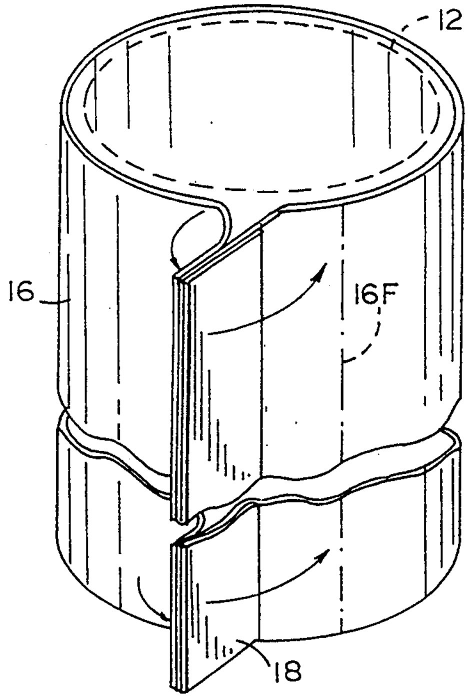
FIG. 4 is a perspective view of the novel sleeve before being placed around a cylindrical article such as a gas cylinder, shown in phantom.
Figure 5:
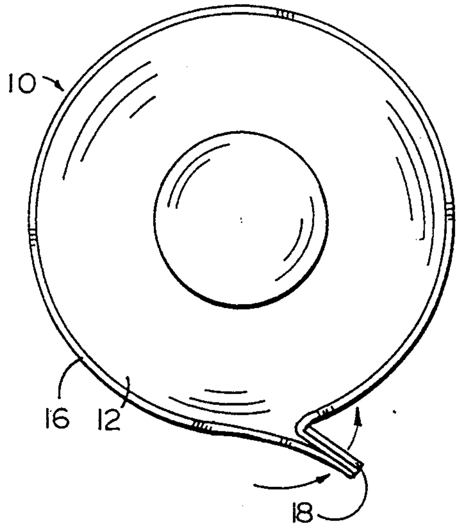
FIG. 5 is an end elevational view of the novel sleeve label around a gas cylinder, with the space therebetween being exaggerated, the sleeve label strip in the process of being pivoted to apply the label to the cylinder.
Figure 6:
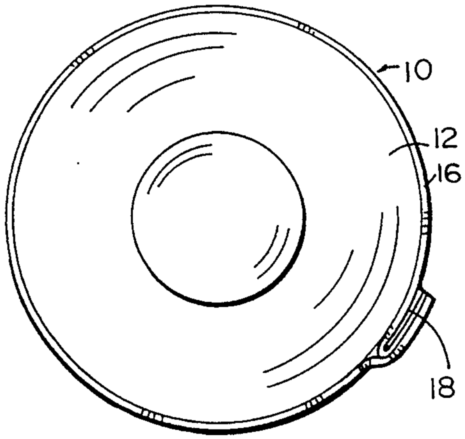
FIG. 6 is an end elevational view of the sleeve label as applied to the cylinder.

Stiff strip 18 is utilized to secure the label to the container 12 in the manner shown by the illustrative sequential FIGS. 4, 5 and 6. More specifically, the sleeve has an initial circumference which is substantially larger than the circumference of the object, e.g., gas cylinder 12 shown in FIG. 4 in phantom lines, so as to be easily slid axially over the cylinder. The inner surface of label sleeve 16 preferably has a nonslip, high friction material 16' (FIG. 2) previously applied thereto. Such nonslip materials are well known in the art and can be selected for a desired degree of friction and other characteristics as required by the particular application. Preferably the material is a polyolefin based, hot melt thermoplastic based material which is not tacky at ambient temperatures, such as an ethylene/vinyl acetate polymer, or other nonslip materials such as polyethylene, e.g., a polyethylene material designated "ELVAX" from DuPont Corporation of Wilmington, Del., polypropylene (amorphous or nonamorphous), block copolymers including SIS types, ethylene-ethyl acrylate polymer, ethylene-propylene-diene polymer, atactic polypropylene, polyamides, rubber based materials, polyacrylics, and the like, which are known in the trade to give nonslip characteristics. Such a material is preferably applied in a dot matrix pattern, for example, in the manner set forth in U.S. Pat. No. 4,725,465. Such a dot matrix of the polymer comprises a discontinuous pattern of teat-like protuberances which interfit with the undulations and irregular surfaces of the rough metal which is characteristic, for example, of gas cylinders. This interfit provides excellent nonslip character to the label sleeve. Yet, the sleeve is easily placed over the cylinder because it need not touch it significantly. In some uses of the novel sleeve label, no such added nonslip material may be needed.

In securing of the sleeve label to the object, strip 18 is utilized as a lever to tighten the sleeve and secure it in place. More specifically, referring to FIGS. 4 and 5, strip 18 is pivoted about its one edge 18A from which the label sleeve 16 extends. This pivotal action flexes the label sleeve at edge 18A, to rotate the strip about this edge and pull the opposite end portion of the label sleeve toward edge 18A, such that further pivotal turning of the outer face of the strip inwardly against the label sleeve simultaneously pulls a segment of the sleeve outwardly of the strip and decreases the circumference of the sleeve to that of the object, and thereby cause it to grip the cylinder. This action thus tightens the label sleeve onto the article so that the nonslip inner sleeve surface grips the article. Prior to or during this activity, the protective cover 22 is removed from the adhesive layer 20 such that, when the outer face of strip 18 is pressed against the portion 16F of label sleeve 16 shown in phantom lines in FIG. 4, the strip will be secured adhesively to the outer surface of the label sleeve, as shown in FIG. 6. The sleeve label is thus firmly secured in place on the article, e.g., gas cylinder, and bears the indicia required by the manufacturer, the customer and federal regulations.

Later, when it is desired to replace the label with another one, this label can be easily removed from the article either by breaking the strip loose from its adhesive and sliding the sleeve off, or alternatively cutting the length of the label with a knife blade to allow it to be peeled off without any label or adhesive deposits remaining.

Figure 7:
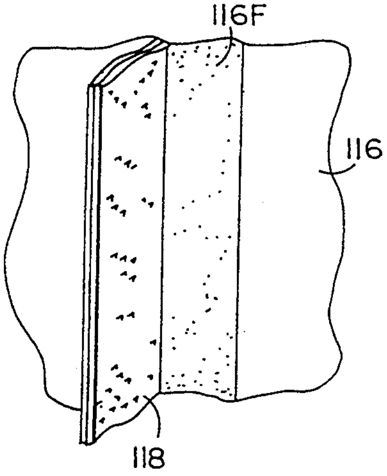
FIG. 7 is a greatly enlarged, fragmentary, elevational view of the novel sleeve label showing an alternative securing means of the strip to the outer surface of the sleeve.

In FIG. 7 is disclosed an alternative means for securing the strip to the adjacent portion of the label sleeve. More specifically, strip 118 and label sleeve 116, and particularly the portion 116F thereof immediately adjacent the strip, are shown to have conventional hook and loop fastener materials, one, e.g., the hooks 118 on the strip, and the other, e.g., the loops 116 on the label. Such hook and loop fasteners, e.g., VELCRO®, can be previously applied to the two components so that the label may be easily applied in the manner set forth above, and just as easily removed, yet will retain its position on the article as needed.

Figure 8:
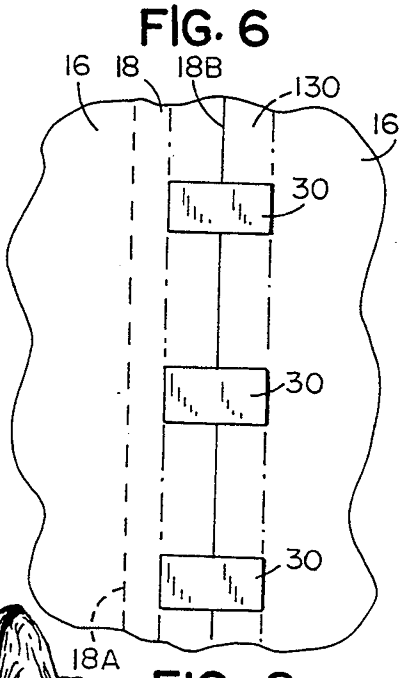
FIG. 8 is a fragmentary, enlarged, elevational view of the sleeve label showing alternative securing means of the rotated strip to the label sleeve.
Figure 9:
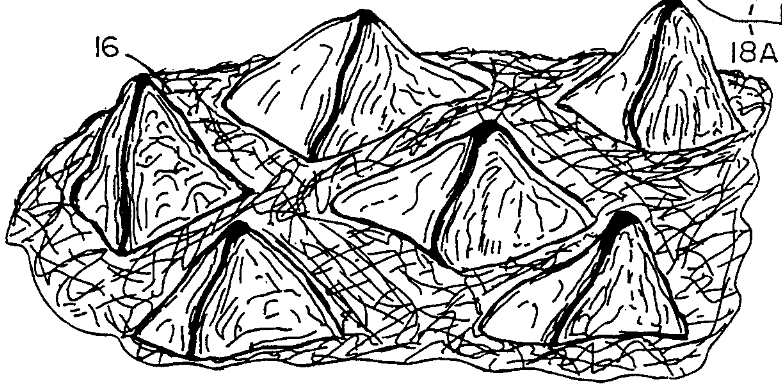
FIG. 9 is a fragmentary, greatly enlarged, perspective view of a portion of the inside surface of the label sleeve showing a dot coat pattern of polymeric protrusions.

In FIG. 8 is shown two more alternatives for securing the strip 18 in position on the label sleeve 16, this means comprising a plurality of tape segments 30 at spaced intervals along the length of the strip and sleeve, securing the strip to label sleeve 16. Alternatively, as shown in phantom lines in FIG. 8, this may comprise an elongated adhesive band 130 as of tape or the like, to not only secure strip 18 to label sleeve 16 but also totally cover the edge 18B of the strip.

It is conceivable that those having skill in this art, once having reviewed this disclosure and the specific preferred embodiments set forth as illustrative of the invention, may conceive of other variations within the concept presented. Therefore, it is not intended that the invention be limited to the specific embodiments set forth, but only by the scope of the appended claims and the equivalent structures to those set forth therein.

The embodiments of the invention in which an exclusive property or privilege is claimed are defined as follows:

1. A sleeve label for application to the peripheral exterior of an article comprising:

a flexible label sleeve adaptable for being printed indicia having a circumference and a central axis, and having first and second portions parallel to said axis and extending the length of said label sleeve;

an elongated, stiff strip having first and second edges extending the length of said strip, and having an inner face and an outer face;

said first sleeve portion being attached to said strip to extend from and be flexible about said first edge of said strip, and said second sleeve portion being attached to said strip to extend from said inner face at a location spaced from said first edge of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a segment of said sleeve outwardly of said strip, and thereby decrease the circumference of said sleeve; and securing means for securing said outer face of said strip to said sleeve.

2. The sleeve label in claim 1 wherein said outer face of said strip is coated with adhesive, thereby suitable for forming said securing means by adhering said strip to said sleeve.

3. The sleeve label in claim 2 wherein said adhesive is a pressure sensitive adhesive, and including a removable protective cover over said adhesive.

4. A sleeve label for application to the peripheral exterior of an article comprising:

a flexible label sleeve adaptable for bearing printed indicia, having a circumference and a central axis, and having first and second portions parallel to said axis and extending the length of said label sleeve;

an elongated, stiff strip having first and second edges extending the length of said strip, and having an inner face and an outer face;

said first sleeve portion being attached to said strip to extend from and be flexible about said first edge of said strip, and said second sleeve portion being attached to said strip to extend from said inner face at a location spaced from said first edge of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a segment of said sleeve outwardly of said strip, and thereby decrease the circumference of said sleeve;

securing means for securing said outer face of said strip to said sleeve;

said label sleeve having an inside surface having a nonslip material thereon;

said nonslip material being in a matrix pattern of protrusions; and said matrix pattern comprises a dot matrix pattern of teat-like protrusions.

5. The sleeve label in claim 1 wherein said second sleeve portion extends from said inner face of said strip intermediate said first and second edges of said strip.

6. A sleeve label for application to the peripheral exterior of an article comprising:

a flexible label sleeve adaptable for bearing printed indicia, having a circumference and a central axis, and having two sleeve ends parallel to said axis and extending the length of said label sleeve;

said label sleeve being slightly stretchable;

an elongated, stiff strip having first and second edges extending the length of said strip, and having an inner face and an outer face;

said first sleeve end being attached to said strip to extend from and be flexible about said first edge of said strip, and said second sleeve end being attached to said strip to extend from said inner face at a location intermediate said edges of said strip;

said strip being on the exterior of said label sleeve, with said second edge of said strip and said outer face of said strip being exposed; and said strip being pivotable about said first edge of said strip to flex said sleeve at said first edge of said strip and about said first edge of said strip, to turn said outer face of said strip inwardly against said label sleeve and simultaneously pull a portion of said sleeve outwardly of said strip, and stretch said label sleeve, and thereby decrease the circumference of said sleeve.

7. A sleeve label for application to the peripheral exterior of an article comprising:

a flexible label sleeve having a circumference and a central axis, and having first and second portions parallel to said axis and extending the length of said label sleeve adaptable for bearing printed indicia;

an elongated, stiff strip having first and second edges extending the length of said strip, and having an inner face and an outer face;

said first sleeve portion being attached to said strip to extend from and be flexible about said first edge of said strip, and said second sleeve portion being attached to said strip to extend from said inner face at a location spaced from said first edge of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a segment of said sleeve outwardly of said strip, and thereby decrease the circumference of said sleeve;

securing means for securing said outer face of said strip to said sleeve;

said label sleeve having an inside surface having a nonslip material thereon; and said outer face of said strip being coated with adhesive, thereby suitable for forming said securing means by adhering said strip to said sleeve.

8. A sleeve label for application to the peripheral exterior of an article comprising:

a flexible label sleeve having a circumference and a central axis, and having first and second portions parallel to said axis and extending the length of said label sleeve adaptable for bearing printed indicia;

an elongated, stiff strip having first and second edges extending the length of said strip, and having an inner face and an outer face;

said first sleeve portion being attached to said strip to extend from and be flexible about said first edge of said strip, and said second sleeve portion being attached to said strip to extend from said inner face at a location spaced from said first edge of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a segment of said sleeve outwardly of said strip, and thereby decrease the circumference of said sleeve;

securing means for securing said outer face of said strip to said sleeve;

said label sleeve having an inside surface having a nonslip material thereon;

said nonslip material being in a matrix pattern of protrusions;

said adhesive comprises a pressure sensitive adhesive, and including a removable protective cover over said adhesive.

9. A sleeve label for application to the peripheral exterior of an article comprising:

a flexible label sleeve having a circumference and a central axis, and having two sleeve ends parallel to said axis and extending the length of said label sleeve adaptable for bearing printed indicia;

an elongated, stiff strip having first and second edges extending the length of said strip, and having an inner face and an outer face;

said first sleeve end being attached to said strip to extend from and be flexible about said first edge of said strip, and said second sleeve end being attached to said strip to extend from said inner face at a location intermediate said edges of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a portion of said sleeve outwardly of said strip, and thereby decrease the circumference of said sleeve; and said label sleeve having an inside surface having a nonslip material thereon.

10. The sleeve label in claim 9 wherein said nonslip material comprises a matrix pattern of protrusions.

11. The sleeve label in claim 10 wherein said matrix pattern comprises a dot matrix pattern of teat-like protrusions.

12. A sleeve label for application to the peripheral exterior of an article comprising:

a flexible label sleeve having a circumference and a central axis, and having first and second portions parallel to said axis and extending the length of said label sleeve adaptable for bearing printed indicia;

an elongated, stiff strip having first and second edges extending the length of said strip, and having an inner face and an outer face;

said label sleeve having an inside surface having a nonslip material thereon;

said first sleeve portion being attached to said strip to extend from and be flexible about said first edge of said strip, and said second sleeve portion being attached to said strip to extend from said inner face at a location spaced from said first edge of said strip;

said strip being on the exterior of said label sleeve, with said second edge of said strip and said outer face of said strip being exposed;

said strip being pivotable about said first edge of said strip to flex said sleeve at said first edge of said strip and about said first edge of said strip, to turn said outer face of said strip inwardly against said label sleeve and simultaneously pull a segment of said sleeve outwardly of said strip, and thereby decrease the circumference of said sleeve; and securing means for securing said outer face of said strip to said sleeve.

13. The sleeve in claim 12 wherein said nonslip material comprises a matrix pattern of protrusions.

14. A sleeve label for application to the peripheral exterior of an article comprising:

a flexible, slightly stretchable label sleeve adaptable for bearing printed indicia, having a circumference and a central axis, and having two sleeve ends parallel to said axis and extending the length of said label sleeve;

said label sleeve having an inside surface having a nonslip material thereon;

said nonslip material comprises matrix pattern of protrusions;

an elongated, stiff strip having first and second edges extending the length of said strip, and having an inner face and an outer face;

said first sleeve end being attached to said strip to extend from and be flexible about said first edge of said strip, and said second sleeve end being attached to said strip to extend from said inner face at a location intermediate said edges of said strip;

said strip being on the exterior of said label sleeve, with said second edge of said strip and said outer face of said strip being exposed;

said strip being pivotable about said first edge of said strip to slightly stretch said sleeve and to flex said sleeve at said first edge of said strip and about said first edge of said strip, to turn said outer face of said strip inwardly against said label sleeve and simultaneously pull a portion of said sleeve outwardly of said strip, and thereby decrease the circumference of said sleeve;

said outer face of said strip being coated with adhesive, forming said securing means by adhering said strip to said sleeve; and said adhesive comprises a pressure sensitive adhesive, and including a removable protective cover over said adhesive.

15. The sleeve label in claim 1 wherein said label sleeve is slightly stretchable.

* * * * *

UNITED STATES PATENT AND TRADEMARK OFFICE

CERTIFICATE OF CORRECTION

PATENT NO. : 5,422,152

DATED : June 6, 1995

INVENTOR(S) : Robert J. Langeland et al.

It is certified that error appears in the above-indentified patent and that said Letters Patent is hereby corrected as shown below:

Column 2, Line 42;
"pans" should be -- parts --;

Column 2, Line 54;
"pan" should be -- part --;

Column 6, Line 30;
After "sleeve" insert -- adaptable for bearing printed indicia --;

Column 6, Line 33;
Delete "adaptable for bearing printed indicia";

Column 6, Line 62;
After "sleeve" insert -- adaptable for bearing printed indicia --;

Column 6, Line 65;
Delete "adaptable for bearing printed indicia";

Column 7, Line 29;
After "sleeve" insert -- adaptable for bearing printed indicia --;

UNITED STATES PATENT AND TRADEMARK OFFICE
CERTIFICATE OF CORRECTION

PATENT NO. : 5,422,152
DATED : June 6, 1995
INVENTOR(S) : Robert J. Langeland et al.

It is certified that error appears in the above-indentified patent and that said Letters Patent is hereby corrected as shown below:

Column 7, line 32;
Delete "adaptable for bearing printed indicia";

Column 7, Line 61;
After "sleeve" insert -- adaptable for bearing printed indicia --;

Column 7, Line 64;
Delete "adaptable for bearing printed indicia".

Signed and Sealed this

Nineteenth Day of December, 1995

Attest:

BRUCE LEHMAN

*Attesting Officer* *Commissioner of Patents and Trademarks*